United States Patent
Anderson

(10) Patent No.: US 7,459,419 B2
(45) Date of Patent: Dec. 2, 2008

(54) CD CLEANER AND RESTORER COMPOSITION AND METHOD

(76) Inventor: Leslie C. Anderson, 1200 N. Church St., #3, Layton, UT (US) 84041

( * ) Notice: Subject to any disclaimer, the term of this patent is extended or adjusted under 35 U.S.C. 154(b) by 531 days.

(21) Appl. No.: 11/300,990

(22) Filed: Dec. 15, 2005

(65) Prior Publication Data

US 2006/0094618 A1    May 4, 2006

Related U.S. Application Data

(63) Continuation-in-part of application No. 10/651,312, filed on Aug. 28, 2003, now Pat. No. 6,992,051.

(51) Int. Cl.
     *C11D 7/22*    (2006.01)
     *C09G 1/08*    (2006.01)
     *B05D 1/36*    (2006.01)
     *G11B 3/58*    (2006.01)

(52) U.S. Cl. .................. 510/168; 510/205; 510/208; 510/241; 510/242; 510/266; 106/3; 134/4

(58) Field of Classification Search ............... 510/168, 510/205, 208, 241, 242, 266; 106/3; 134/4
See application file for complete search history.

(56) References Cited

U.S. PATENT DOCUMENTS

| | | | | |
|---|---|---|---|---|
| 3,959,530 A | * | 5/1976 | Kaliardos ............... 427/341 |
| 3,992,335 A | | 11/1976 | Denissenko et al. |
| 4,013,475 A | * | 3/1977 | Liebowitz et al. ........ 106/10 |
| 4,592,934 A | * | 6/1986 | Wolstoncroft ........... 427/355 |
| 4,665,116 A | * | 5/1987 | Kornhaber et al. ...... 524/268 |
| 4,693,840 A | * | 9/1987 | Trinh et al. ............. 510/242 |
| 4,952,248 A | | 8/1990 | Aberg |
| 5,057,152 A | * | 10/1991 | Marcus et al. ............ 106/3 |
| 5,641,345 A | * | 6/1997 | Henry .................... 106/10 |
| 5,650,001 A | | 7/1997 | Howell |
| 5,700,312 A | | 12/1997 | Fausnight et al. ........ 106/10 |
| 5,948,849 A | * | 9/1999 | Porter .................... 524/506 |
| 5,968,238 A | | 10/1999 | Healy et al. .............. 106/3 |
| 6,261,159 B1 | | 7/2001 | Krieg et al. |
| 6,551,974 B1 | | 4/2003 | Congrad et al. |
| 6,669,763 B1 | | 12/2003 | Ghodoussi ............. 106/10 |
| 6,685,765 B1 | | 2/2004 | Ghodoussi ............. 106/10 |
| 6,992,051 B2 | * | 1/2006 | Anderson ............... 510/205 |
| 7,316,993 B2 | * | 1/2008 | Anderson ............... 510/205 |
| 7,381,231 B2 | * | 6/2008 | Smith et al. ............. 51/307 |

OTHER PUBLICATIONS

CD Repair Kits versus various goops from kitchen & bathroom http://www.burningissues.net/how_to/scratchrepair.htm.

\* cited by examiner

*Primary Examiner*—Douglas Mc Ginty
(74) *Attorney, Agent, or Firm*—Marcus G. Theodore

(57) ABSTRACT

A single step rub-on, rub-off combination cleaning and waxing CD and DVD restoration method and composition particularly suited for repairing damaged and dirty reflective coatings.

10 Claims, No Drawings

CD CLEANER AND RESTORER COMPOSITION AND METHOD

RELATED APPLICATIONS

This application is a continuation-in-part application of the original patent application entitled "Combination Cleaning and Waxing Composition and Method" filed Aug. 28, 2003, Ser. No. 10/651,312 now U.S. Pat. No. 9,662,051.

BACKGROUND OF THE INVENTION

1. Field of Invention

The present invention relates to cleaning and restoring solutions for CDs. In particular, it relates to a single application rub-on, rub-off combination restorer, cleaner and waxing solution particularly suited for CDs and DVDs.

2. Description of Related Art

Cleaning and waxing solutions for CDs and DVDs are known. A typical CD is a layered piece of injection molded clear polycarbonate plastic. During manufacturing, the clear polycarbonate plastic is impressed with microscopic bumps (ridges and lands) arranged as a single continuous, extremely long spiral track of data circling from the inside of the disc to the outside. The height between the ridges and lands is such that the difference in height between the two is exactly a quarter of a wavelength of the laser beam light. When one half the laser light is reflected from the upper ridge, and the other half hits the lower land surface the resultant reflected light is out of phase and cancels one another out at the ridge/land junction. Once the clear piece of polycarbonate is formed, a thin, reflective aluminum layer is applied covering the bumps. A thin acrylic layer is then sprayed over the aluminum to protect it, and a label is then printed onto the acrylic.

To read the CD, it is optically scanned with a laser light directed through the clear polycarbonate plastic onto the bumps. The refracted laser light is then read by a photo-electric cell and converted into a series of electrical pulses forming digital signals dependent upon whether the laser strikes a "ridge/land" junction, producing a weak reflection, or a "land" or "ridge" producing a stronger signal. Thus the photoelectrical cell receives a series of light pulses corresponding to the length of the ridges and lands in the disc. These light pulses are then converted into binary "digital" data substituting an "O" for a weak signal from a ridge/land junction and a "1" for an in-focus signal from a "ridge" or a "land". A digital to analogue converter then converts the series of pulses (binary coding) into a waveform that is processed for amplification.

Many CD players use three-beam scanning for correct tracking. The three beams come from one laser. A polarized prism projects three spots of light on the track. It shines the middle one exactly on the track, and the two other "control" beams generate a signal to correct the laser beam immediately, should it deflect from the middle track.

The refractive tolerances of a typical CD are thus extremely critical as they hold about 2 MB of data on the spiral data track. This data track is approximately 0.5 microns wide, with 1.6 microns separated one track from the next and the bumps are even smaller so they must be handled and treated with care.

The CD is a plastic disc I 0.2 mm thick and 12 cm in diameter, with a silver-coated surface that reflects laser light. The maximum playing time for music recorded on compact disc is 74 minutes. The CD has several layers. First, to protect the 8 trillion microscopically small pits against dirt and damage, the CD has a plastic protective layer. On the top of this layer the label is printed. Then there is the reflecting aluminum coating which contains the ridges. Finally, the disc has a transparent carrier through which the actual reading of the disc takes place. This plastic forms a part of the optical system. Mechanically, the CD is less vulnerable than the analogue record, but that does not mean that it must not be treated with care. The protective layer on the label side is very thin: only 0.002 mm. Careless treatment or granular dust can cause small scratches or hair cracks, enabling the air to penetrate the evaporated aluminum coating. This coating then starts oxidizing immediately at that spot. If the CD is played extensively, it may be advisable to protect the label side with a special protective foil, which is commonly available in shops. A CD must never be bent, so care should be taken when removing it from the jewel case. Even slight bending causes stress fractures. The aluminum then becomes deformed, causing some ridges to be blocked. As a consequence, error correction always has to be applied in that area, affecting the final sound.

The reflecting side of the CD is the side that is read. People tend to set the CD down with the reflecting side up. But the more vulnerable side is not the reflecting side but the label side. On the label side, the reflecting layer with its ridges has been evaporated. The sensitive layer on the reflecting side has been protected better than the one on the label side. It is therefore better to store CDs with the reflecting side down. It is best to store the CD back in the jewel case, where it is safely held by its inside edge. Never write on the label side, even with a felt tipped pen. The ink may penetrate the thin protective coating and affect the aluminum layer. If a smear, however small, remains on the CD, much in formation is lost.

CDs are easily scratched, and should never be cleaned with just any cloth. CDs should be cleaned radially: not along the grooves, but at right angles to the direction of the grooves. If a smear, however small, should remain on the CD, running along the direction of the grooves, much information would be lost. It is advisable to use special CD cleaner that operates with a rotating brush at right angles to the direction of the grooves.

To repair the surface reflecting coverings of a damaged CD or DVD, the patents fall in two categories: a metal polishing grinder approach to repair the CD surface of the optical storage medium, see Krieg et al, U.S. Pat. No. 6,261,159 B1, and a coating application repair method of the CD surface, see Howell, U.S. Pat. No. 5,650,001 using silicones instead of wax to fill in surface scratches and improve the temperature range of the treated disc. A CD Repair Kit article from the internet discusses tests of a number of products and methods (Memorex, Maxell, Disc-Saver, Crystal-Disc, Acetone, Toothpaste, Brasso Metal Polish, Rubbing Compound and Comet Cleanser) and found that Brasso metal polish with a mild siliceous polishing powder suspended in ammonium soap jelly and dispersed in Stoddard Solvents is rated as the best product so far (note multiple applications improved results).

Cited for general interest are various waxes and paint restorers: Denissenko et al, U.S. Pat. No. 3,992,335 discloses a self-shining floor care composition capable of rendering the surface of a substrate such as a wooden parquet floor shiny, without prior wax stripping and without subsequent polishing. It provides an anhydrous solution comprising of at least six and preferably seven constituents:

1. a solid, film-forming macromolecular compound,
2. a hard resin,
3. a liquid plasticizer,
4. a solid plasticizer, 5. a solvent mixture consisting of at least one lower alkanol and
6. a liquid co-solvent, and
7. an optional silicone oil.

Dinissenko et al is not adapted to restore oxidized painted surfaces of automobiles and other items before application. It therefore requires a paint restoration step before application.

Aberg, U.S. Pat. No. 4,952,248 discloses a method and apparatus for dry cleaning and shining of vehicles, especially motor vehicles and other waxable surfaces. The method includes the steps of applying a solution of ammonia, water and alcohol to the surface of the vehicle or other waxable surface, toweling the surface to spread the applied solution, partially remove and evaporate it to allow the alcohol to liquefy or soften the wax on the surface preparatory to finish polishing. It provides a chemical means for leveling the wax on the surface replacing mechanical buffing. The preferred solution includes 1½ ounces of commercially available ammonia preparation, 10 ounces of water and 4 ounces of isopropyl alcohol. Alternatively the solution includes 1½ ounces of ammonia with 6 ounces of water and 4 ounces of isopropyl alcohol (70% by volume), or mixtures within these ranges. Aberg also requires a prior paint restoration step to remove paint oxidation before applying a waxing mixture Conrad et al., U.S. Pat. No. 6,551,974 discloses a composition and method for use in imparting or maintaining a glossy or shiny finish on a hard surface. In one embodiment, the composition comprises a base polish component or components, and at least one poly [oxyalkyline] ammonium cationic surfactant, which provides an improved gloss or shine imparting properties. It is then applied to the hard surface. The poly [oxyalkyline] ammonium cationic surfactant comprises in the range of about 0.01 to about 10 wt. %, more preferably in the range of about 0.05 to about 5 wt. % and more preferably in the range of about 0.1 to about 1 wt. % of total composition. This composition preferably includes polishing agent abrasives to remove contaminants. These abrasives reduce the paint surface thickness and require extensive buffing for removal.

Other paint cleaning and waxing solutions require separate multiple sequential steps of the application and removal of paint restorers, and waxes.

The present invention described below provides a combination mild abrasive hard wax restorer with built in polish operating over an extensive temperature range, which is a significant improvement over these methods and apparatus described above as it doesn't require multiple coats or require a grinding apparatus.

SUMMARY OF THE INVENTION

The present invention comprises a combination cleaner and waxing CD and DVD restorer solution providing a one step restorer and wax applicator to impart a high gloss finish on a hard surface without extensive polishing. The composition comprises:
  a. a paint sealant comprising 18-27% of the solution
  b. a clear coat cleaner comprising 18-27% of the solution
  c. a fast acting paint restorer comprising 18-27% of the solution
  d. a polymer paint sealant comprising 18-27% of the solution, and
  e. a velocity glaze comprising 5-10% of the solution.

The preferred paint sealant is produced by Sealtek International Corporation, S.R.I via Trevisan 7/A 35010 Vigongza PD, Italy known as Sealtek—ACR Paint Sealant 30008101 comprised of petroleum distillate, mild polishing agents, cleaners, and reactive silicones.

The preferred clear coat cleaner is Duz-All® clear coat cleaner oil base formula P-40, produced by BAF Industries Corporation a California, 1910 South Yale Street, Santa Ana, Calif. 92070. It is a mild cutting cream utilizing very fine polishing agents to gently clean every type of finish. It removes 100-1500 grit sanding scratches, acid rain damage, water spots, surface blemishes, fallout and light to medium oxidation for hand or machine use and contains no wax. It is comprised of silica, water (7732-18-5), diatomomite (61790-53-2), aliphatic petroleum distillate (64742-47-8), and pine oil (8001-09-3).

The preferred fast acting paint restorer is Auto Magic® Awesome Gloss produced by Auto Wax Company, Inc. 1275 Round Table Drive, Dallas, Tex. 75247. According to the manufacturer, it is a non-abrasive, premium polymer, which combines superior gloss enhancement with maximum durability. It has a quick dry formula, which goes on like a wax, yet lasts like a sealant, which may be applied with an orbital buffer or a variable speed polisher. It contains water (7732-18-5), mineral spirits (64742-48-9), aluminum silicates (66402-68-4), silicone fluid (63148-62-9), and petroleum distillate.

The preferred polymer paint sealant is Pro Products® Polymer II Sealant produced by Pro Products, Inc., a California Corporation, 847 S. Wanamaker Avenue, Ontario, Calif. 91761, Item #P-39-1, which according to the manufacture is a liquid paint sealant which gives beautiful, long lasting protection to any finish and is fortified with Teflon® to reduce surface friction and is excellent for use on daily driven cars that need maximum protection from the elements. It contains paint sealant, architectural polymer resins, polytetrafluroethylene (PTFE), petroleum distillates, silica, CAS #7732-18-05, CAS #8052-41-3, CAS #66402-68-4, siloxane fluid mixture CAS #61790-12-3, and petroleum spirits.

The preferred velocity glaze is a speed hand wax-buffer high polish produced by P & S Sales, Inc. of 20943 Cabot Blvd, Hayward, Calif. 94545 called VELOCITY GLAZE #C13. According to the manufacturer, it quickly enhances and brightens paint finishes. Velocity Glaze features a unique luxurious lotion-like emulsion system designed for ease of application and dust-free product removal. This product may be used as a speed hand wax, orbital wax or DA machine polish in all detailing applications. They have formulated this product to be slightly moister to enhance dark or difficult to wax finishes. This product is perfect for use on all types of finishes including cars, trucks, motorcycles, boats and planes.

The first four components are admixed and form a clear solution. When the last velocity glaze component is added, a smooth creamy solution results containing paint sealant, architectural polymer resins, polytetrafluroethylene (PTFE) petroleum distillates, silica CAS #7732-18-5 CAS #8052-41-3 CAS #66402-68-4, siloxane fluid mixture CAS #617900-12-3, petroleum spirit, water (7732-18-5), Diatomite (61790-53-2), aliphatic petroleum distillate 64742-47-8), pine oil (8002-09-3), mineral spirits (64742-48-9), aluminum silicates (66402-68-4), mild polishing agents, cleaners, and reactive silicones.

The above chemical components have not previously been combined together as heretofore it has been thought that they were not chemically compatible or acted in a manner, which did not produce synergistic combined action.

The resultant cleaning and polishing restorer solution, when friction applied to damaged CD and DVD surfaces, results in surface changes, presumably caused by friction during the application of the product. The cleaning and polishing restorer solution immediately softens and removes oxidization from the surface covering. It is evenly applied and forms a wax like film after 15 to 20 seconds, depending upon drying conditions. The removed oxidized surface coating is embedded in the wax like film, and is then rubbed off to seal the original covering with a hard wax coating. The resultant hand rubbed hard wax finish which restores the surface reflecting properties of the damaged CD or DVD without multi-step operations involving oxidized coating removal, wax application, and machine buffing.

The present invention is therefore particularly adapted to restore and wax damaged CD and DVD surfaces, leaving a hard coating with a single application and removal operation. Because of the number of chemical components, the exact cleaning and polishing mechanism is presently not known.

The above description and specification should not be construed as limiting the scope of the invention but as merely providing illustrations of some of the presently preferred embodiments of this invention. Thus, the scope of the invention should be determined by the appended claims and their legal equivalents rather than by the examples given.

I claim:

1. A combination cleaning and waxing CD and DVD restoration solution for damaged CD and DVD surface covering comprising:
   a. a paint sealant comprising 18-27% of the solution,
   b. a clear coat cleaner comprising 18-27% of the solution,
   c. a fast acting paint restorer comprising 18-27% of the solution,
   d. a polymer paint sealant comprising 18-27% of the solution, and
   e. a velocity glaze emulsion comprising 5-10% of the solution, which when mixed with the paint sealant, the clear coat cleaner, the paint restorer and the polymer paint sealant forms a smooth creamy composition for friction application to the damaged CD and DVD surfaces to cause surface changes immediately softening and removing oxidization from the surface covering and forming a wax like film filling scratches to seal the original surface covering and restore the surface reflecting properties of the damaged CD or DVD.

2. A combination cleaning waxing CD and DVD restoration solution according to claim 1, wherein the chemical components comprise paint sealant, architectural polymer resins, polytetrafluroethylene (PTFE) petroleum distillates, silica CAS #7732-18-5, Stoddard Solvent CAS #8052-41-3, blend of anhydrous aluminum silicates CAS #66402-68-4, liquid siloxane mixture CAS #617900-12-3, petroleum spirit, water (7732-18-5), diatomaceous earth (61790-53-2), aliphatic petroleum distillate (64742-47-8), pine oil (8002-09-3), mineral spirits (64742-48-9), mild polishing agents, cleaners, and reactive silicones.

3. A combination cleaning waxing CD and DYD restoration solution according to claim 1, wherein the paint sealant comprises petroleum distillate, mild polishing agents, cleaners, and reactive silicones.

4. A combination cleaning waxing CD and DVD restoration solution according to claim 1, wherein the clear coat cleaner is comprised of silica, water (7732-18-5), diatomaceous earth (61790-53-2), aliphatic petroleum distillate (64742-47-8), and pine oil (8001-09-3).

5. A combination cleaning waxing CD and DVD restoration solution according to claim 1, wherein the fasting acting paint restorer is comprised of water (7732-18-5), mineral spirits (64742-48-9), aluminum silicates (66402-68-4), silicone fluid (63148-62-9), and petroleum distillate.

6. A combination cleaning waxing CD and DVD restoration solution according to claim 1, wherein polymer paint sealant is comprised of paint sealant, architectural polymer resins, polytetrafluoroethylene (PTFE), petroleum distillates, silica CAS #7732-18-05, Stoddard Solvent CAS #8052-41-3, blend of anhydrous aluminum silicates CAS #66402-68-4, liquid siloxane mixture CAS #61790-12-3, and petroleum spirits.

7. A combination cleaning waxing CD and DVD restoration solution according to claim 1, wherein the velocity glaze emulsion comprises a speed hand wax-buffer high polish.

8. A combination cleaning waxing CD and DVD restoration solution according to claim 1 comprising:
   a. a paint sealant comprised of petroleum distillate, mild polishing agents, cleaners, and reactive silicones comprising 18-27% of the solution,
   b. a clear coat cleaner comprised of silica, water (7732-18-5), diatomaceous earth (61790-53-2), aliphatic petroleum distillate (64742-47-8), and pine oil (8001-09-3) comprising 18-27% of the solution,
   c. an fast acting paint restorer comprised of water (7732-18-5), mineral spirits (64742-48-9), aluminum silicates (66402-68-4), silicone fluid (63148-62-9and petroleum distillate comprising 18-27% of the solution,
   d. a polymer paint sealant comprised of paint sealant, architectural polymer resins, polytetrafluroethylene (PTFE), petroleum distillates, silica CAS #7732-18-05, Stoddard Solvent CAS #8052-41-3, blend of anhydrous aluminum silicates CAS #66402-68-4, liquid siloxane mixture CAS #61790-12-3, and petroleum spirits comprising 18-27% of the solution, and
   e. a velocity glaze comprised of a speed hand wax-buffer high polish comprising 5-10% of the solution.

9. A method of making a combination cleaning and waxing CD and DVD restoration composition comprising:
   a. mixing together
      1. a paint sealant comprised of petroleum distillate, mild polishing agents, cleaners, and reactive silicones comprising 18-27% of the mixed solution weight,
      2. a clear coat cleaner comprised of silica, water (7732-18-5), diatomaceous earth (61790-53-2), aliphatic petroleum distillate (64742-47-8), and pine oil (8001-09-3) comprising 18-27% of the mixed solution weight,
      3. a fast acting paint restorer comprised of water (7732-18-5), mineral spirits (64742-48-9), aluminum silicates (66402-68-4), silicone fluid (63148-62-9), and petroleum distillate comprising 18-27% of the mixed solution, and
      4. a polymer paint sealant comprised of paint sealant, architectural polymer resins, polytetrafluroethylene (PTFE), petroleum distillates, silica CAS #7732-18-05, Stoddard Solvent CAS #8052-41-3, blend of anhydrous aluminum silicates CAS #66402-68-4, liquid siloxane mixture CAS #61790-12-3, and petroleum spirits comprising 18-27% of the mixed solution to form a solution, and
   b. adding a velocity glaze comprised of a speed hand wax-buffer high polish comprising 5-10% of the mixed solution by weight until a smooth creamy composition results.

10. A method of cleaning and waxing damaged CD and DVD surfaces comprising:
    a. mixing together
       1. a paint sealant comprised of petroleum distillate, mild polishing agents, cleaners, and reactive silicones comprising 18-27% of the mixed solution weight with 2. a clear coat cleaner comprised of silica, water (7732-18-5), diatomaceous earth (61790-53-2), aliphatic petroleum distillate (64742-47-8), and pine oil (8001-09-3) comprising 18-27% of the mixed solution weight, 3. a fast acting paint restorer comprised of water (7732-18-5), mineral spirits (64742-48-9), aluminum silicates (66402-68-4), silicone fluid (63148-62-9), and petroleum distillate comprising 18-27% of the mixed solution, and 4. a polymer paint sealant comprised of paint sealant, architectural polymer resins, polytetrafluroethylene (PTFE), petroleum distillates, silica CAS #7732-18-05, Stoddard Solvent CAS #8052-41-3, blend of anhydrous aluminum silicates CAS #66402-68-4, liquid siloxane mixture CAS #61790-12-3, and petroleum spirits comprising 18-27% of the mixed solution, b. adding a velocity glaze emulsion comprised of a speed hand wax-buffer high polish comprising 5-10% of the mixed solution by weight to the above components until a smooth creamy composition results, c. friction applying the resultant creamy composition to the damaged CD or DVD surfaces to cause surface changes immediately softening and removing oxidization from the surface covering, d. allowing it to dry and form a wax like film, and e. removing the excess wax like film to fill scratches and seal the original surface covering and restore the surface reflecting properties of the damaged CD or DVD.

* * * * *